United States Patent
Nashtahosseini

(10) Patent No.: US 10,487,795 B1
(45) Date of Patent: Nov. 26, 2019

(54) NEO-HYDROELECTRIC POWER SYSTEM

(71) Applicant: Soheil Nashtahosseini, Denton, TX (US)

(72) Inventor: Soheil Nashtahosseini, Denton, TX (US)

( * ) Notice: Subject to any disclaimer, the term of this patent is extended or adjusted under 35 U.S.C. 154(b) by 504 days.

(21) Appl. No.: 14/580,507

(22) Filed: Dec. 23, 2014

Related U.S. Application Data

(60) Provisional application No. 61/920,149, filed on Dec. 23, 2013.

(51) Int. Cl.
*F03B 13/08* (2006.01)
*E02B 9/00* (2006.01)
*F03B 3/12* (2006.01)

(52) U.S. Cl.
CPC .............. *F03B 13/083* (2013.01); *E02B 9/00* (2013.01); *F03B 3/12* (2013.01)

(58) Field of Classification Search
CPC .... F03B 3/12; F03B 3/121; F03B 7/00; F03B 7/003; F03B 11/004; F03B 13/08; F03B 13/083; F03B 15/02; F03B 17/06; F03B 17/063; F03B 17/065; F03B 17/067; F03B 18/08; E02B 9/00; F03D 3/002; F03D 3/005; F03D 3/04; F03D 3/0436; F03D 3/0445; F03D 3/0472; F05B 2220/32; F05B 2240/13
See application file for complete search history.

(56) References Cited

U.S. PATENT DOCUMENTS

| | | | | |
|---|---|---|---|---|
| 921,687 A | * | 5/1909 | Flynn | E02B 9/00 290/4 D |
| 4,137,005 A | * | 1/1979 | Comstock | F03B 13/184 290/53 |
| 4,241,283 A | * | 12/1980 | Storer, Sr. | E02B 9/04 290/43 |
| 4,717,831 A | * | 1/1988 | Kikuchi | F03B 13/184 290/53 |
| 5,440,175 A | * | 8/1995 | Mayo, Jr. | F03B 7/003 290/53 |

\* cited by examiner

*Primary Examiner* — Carlos A Rivera
*Assistant Examiner* — Alexander A White
(74) *Attorney, Agent, or Firm* — Aaron P. Peacock; Gagnon, Peacock & Vereeke P.C.

(57) ABSTRACT

A hydroelectric power system includes a fluid channel having a bottom surface and side walls configured to form a fluid passage, a upraised curved lip integral with the bottom surface and configured to form a cavity, and a turbine in fluid communication with the fluid channel, the turbine being configured to fit at least partially within the cavity of the upraised curved lip. A method includes creating a spatial fluid flow of the fluid traveling through the fluid channel with the upraised curved lip and creating electrical power via the turbine with the fluid passing over the upraised curved lip.

8 Claims, 5 Drawing Sheets

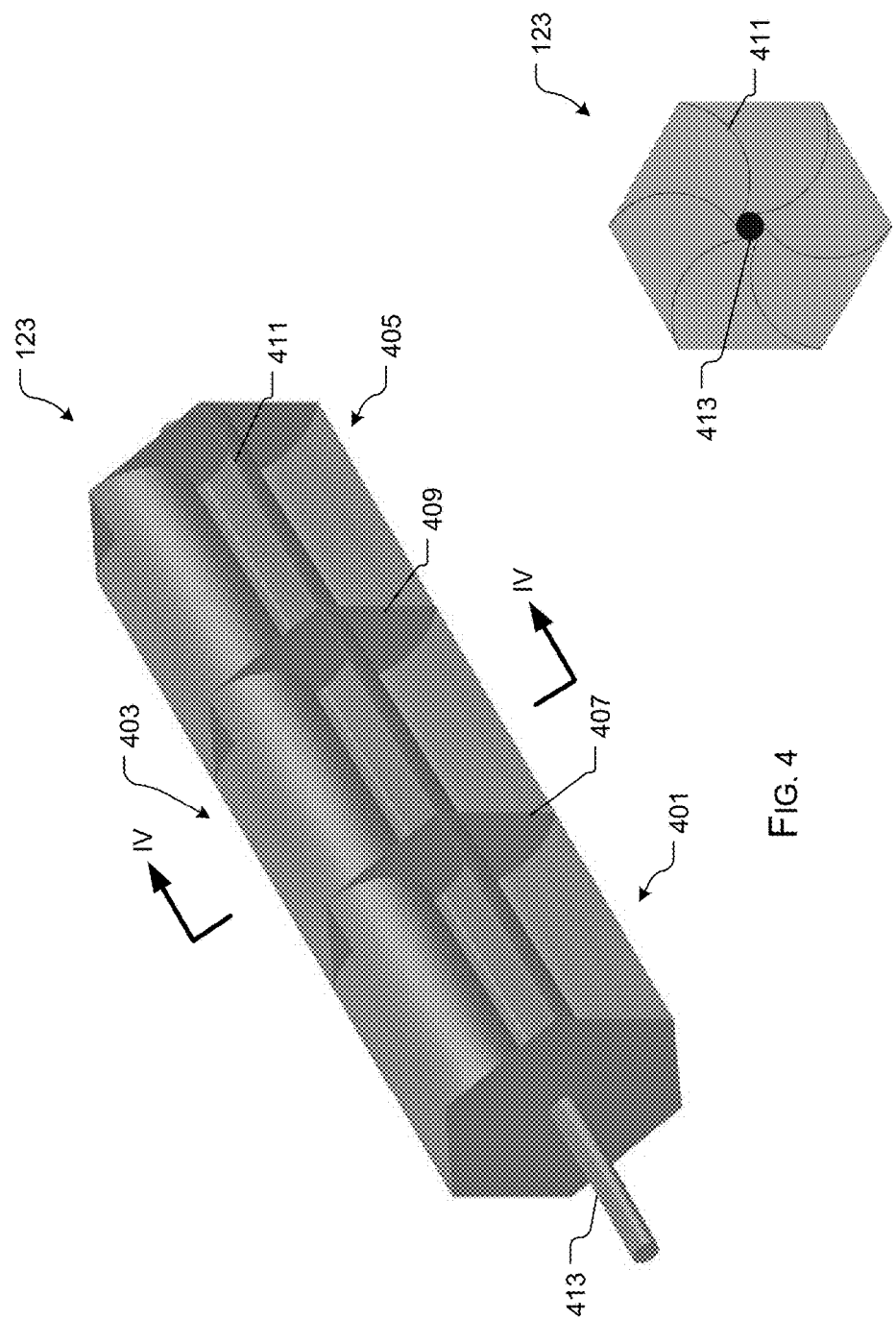

NEO-HYDROELECTRIC POWER SYSTEM

BACKGROUND

1. Field of the Invention

The present invention relates generally to hydraulic power stations.

2. Description of Related Art

Hydraulic powering stations are well known in the art and are effective means to create electrical energy from water energy. More specifically, hydropower is the production of electrical power with the use of the gravitational force of falling or flowing water. It is the most widely used form of renewable energy, accounting for 16 percent of global electricity generation.

One advantage of hydroelectricity is the low cost to create electrical energy, making it a competitive source of renewable energy. For example, it is shown that the average cost of electricity from a hydro plant larger than 10 megawatts is 3 to 5 U.S. cents per kilowatt-hour. Hydro is also a flexible source of electricity since plants can be ramped up and down very quickly to adapt to changing energy demands.

However, significant disadvantages with creating electricity with conventional hydro power exist. For example, Large reservoirs required for the operation of hydroelectric power stations result in submersion of extensive areas upstream of the dams, destroying biologically rich and productive lowland and riverine valley forests, marshland and grasslands. The loss of land is often exacerbated by habitat fragmentation of surrounding areas caused by the reservoir. The hydroelectric projects can be disruptive to surrounding aquatic ecosystems both upstream and downstream of the plant site. Generation of hydroelectric power changes the downstream river environment. Water exiting a turbine usually contains very little suspended sediment, which can lead to scouring of riverbeds and loss of riverbanks. Since turbine gates are often opened intermittently, rapid or even daily fluctuations in river flow can be observed.

Another problem includes siltation and flow shortages. When water flows, it has the ability to transport particles with more density than its density downstream. This has a negative effect on dams and subsequently their power stations, particularly those on rivers or within catchment areas with high siltation. Siltation can fill a reservoir and reduce its capacity to control floods along with causing additional horizontal pressure on the upstream portion of the dam. Eventually, some reservoirs can become full of sediment and useless or over-top during a flood and fail.

Changes in the amount of river flow will correlate with the amount of energy produced by a dam. Lower river flows will reduce the amount of live storage in a reservoir therefore reducing the amount of water that can be used for hydroelectricity. The result of diminished river flow can cause power shortages in areas that depend heavily on hydroelectric power. The risk of flow shortage may increase as a result of climate change. One study from the Colorado River in the United States suggests that modest climate changes, such as an increase in temperature of 2 degree Celsius, results in a 10% decline in precipitation, and might reduce river run-off by up to 40%. Brazil in particular is vulnerable due to its heaving reliance on hydroelectricity—as increasing temperatures lower water flow and alterations in the rainfall regime could reduce total energy production by 7% annually by the end of the century.

Another problem is the Methane Emissions from reservoirs. In tropic regions, there are lower positive impacts, as it has been noted that the reservoirs of power plants in tropical regions produce substantial amounts of methane. This is due to plant material in flooded areas decaying in an anaerobic environment, and forming methane, a greenhouse gas. It should be understood that the reservoir is large compared to the generating capacity (less than 100 watts per square meter of surface area), and no clearing of the forests in the area was undertaken prior to impoundment of the reservoir. Greenhouse gas emissions from the reservoir may be higher than those of a conventional oil-fired thermal generation plant.

In boreal reservoirs of Canada and Northern Europe, however, greenhouse gas emissions are typically only 2% to 8% of any kind of conventional fossil-fuel thermal generation. A new class of underwater logging operation that targets drowned forests can mitigate the effect of forest decay.

Another disadvantage of hydroelectric dams is the need to relocate the individuals who live near the planned reservoirs. In 2000, the World Commission on Dams estimated that dams had physically displaced 40-80 million people worldwide. Because large conventional dammed-hydro facilities hold back large volumes of water, a failure due to poor construction, natural disasters or sabotage can be catastrophic to downriver settlements and infrastructure. Dam failures have been some of the largest man-made disasters in history. The Banqiao Dam failure in Southern China directly resulted in the deaths of 26,000 people and another 145,000 from epidemics. Millions were left homeless. Also, the creation of a dam in a geologically inappropriate location may cause disasters such as 1963 disaster at Vajont Dam in Italy, where almost 2000 people. Smaller dams and micro hydro facilities create less risk, but can form continuing hazards even after being decommissioned. For example, the small Kelly Barnes Dam failed in 1967, causing 39 deaths with the Toccoa Flood, ten years after its power plant was decommissioned.

Although great strides have been made in the area of hydro energy, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 4 is a turbine of the system of FIG. 1;

FIG. 5 is a cross-sectional view of the turbine taken at IV-IV; and

Figure 1:
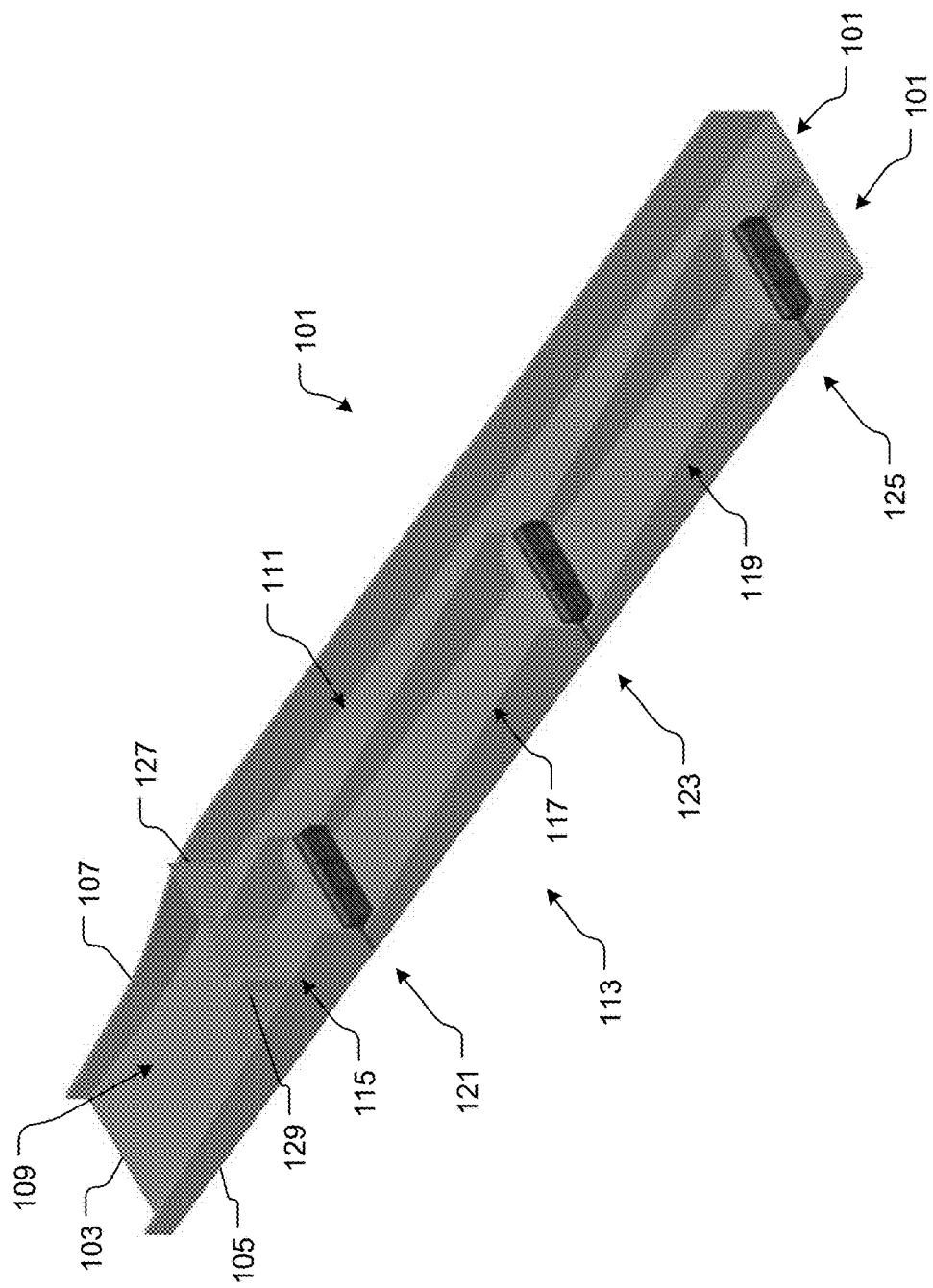
FIGS. 1 and 2 are oblique views of a hydroelectric power system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional hydroelectric systems. Specifically, the system of the present application is configured to provide effective means to create electrical energy from water without causing the above-mentioned transport and collect information from persons passing thereby. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
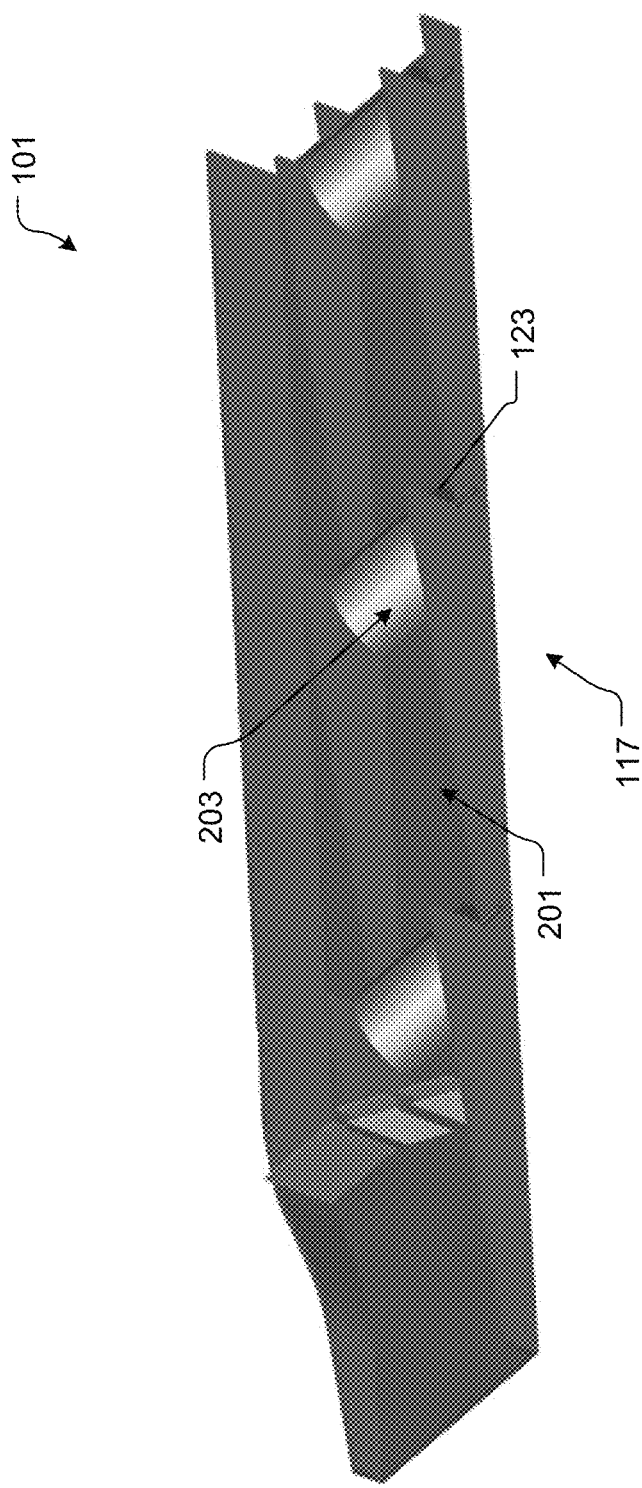

Referring now to the drawings wherein like reference characters identify corresponding or similar elements throughout the several views, FIGS. 1 and 2 depict oblique views of a hydroelectric power system 101 in accordance with a preferred embodiment of the present application. It will be appreciated that the system 101 overcomes one of more of the above-listed problems commonly associated with the conventional hydropower systems.

In the contemplated embodiment, system 101 includes one or more of a primary channel 103 having two sidewalls 105, 107 that form a water passage 109. The primary channel 103 is configured to bifurcate into a bypass channel 111 and a secondary channel 113 having three tiers 115, 117, and 119 that vary in elevation change. Each tier has respective turbines 121, 123, and 125 configured to create electrical power from the water passing down the secondary channel 113. To regulate the fluid flow done each channel, a first gate 127 is operably associated with bypass channel 111, while a second gate 129 is operably associated with secondary channel 113. During use, the gates are configured to allow the desired fluid flow through each channel, which in turn provides optimal power gain.

Figure 3:
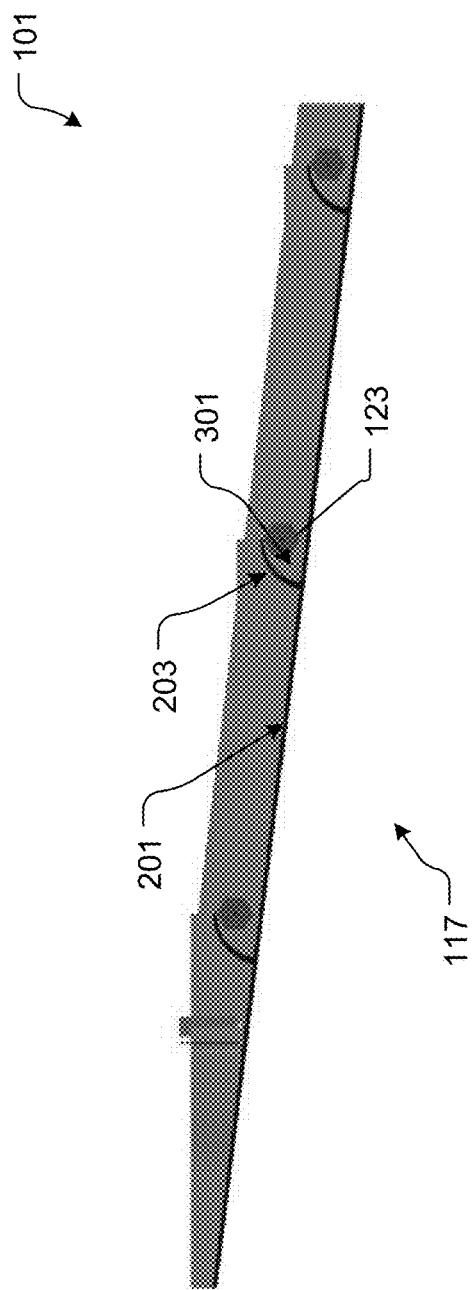
FIG. 3 is a side view of the system of FIG. 1.

Referring specifically to FIGS. 2 and 3 in the drawings, respective oblique and side views of system 101 are shown. As depicted, tier 117 has a bottom declined surface 201 with an upraised curved surface lip 203 that forms a cavity 301 configured to receive partially the turbine 123 therein. During operation, the fluid is configured to flow down the declined bottom surface 201 and over the curved surface lip 203 before reaching the turbine 123. The fluid momentum causes the turbine 123 to rotate, which in turn rotates an electrical generator, not shown.

In FIGS. 4 and 5, respective oblique and side cross-sectional views of the turbine 123 are shown. In the contemplated embodiment, turbine 123 includes three sections 401, 403, and 405 separated by partitions 407, 409 and comprises of a plurality of blades 411. A shaft 413 extends through the middle of each section and is configured to secure the turbine 123 to the sidewalls of the channels. In the preferred embodiment, each section forms a six-sided circumference with six curved blades 411 configured to capture the fluid as it travels over surface 203. The captured fluid in turn causes the turbine to rotate.

Thus, in the contemplated embodiment, the turbine's blades are six semi-cylinders and the diagonal of this blade's metal sheet is one preferably centimeter. This length is used to tolerate the long-term water strokes. In the preferred embodiment, the blades are welded to the partitions and shaft in order to resist in front of water strokes and the strokes will be transferred not only to one blade, but also to other involved parts. It is preferred that if the length of the turbine is more than 5 meters, the diagonal of shaft would not be increased but the length of the shaft should be divided into two equal parts and a triangular base bearing is used in the midpoint of divided parts. This triangular base bearing makes the vertical water strokes ineffective. Complete explanations about triangular bearing are covered in the bearings section. Diameter of the turbine's shaft has an important role in transferring energy. The material and measurements of the shaft should be chosen in a way that would not deflect, break, or hobble.

In the contemplated embodiment, system 101 includes three tiers; however, it will be appreciated that alternative embodiments could include more or less tiers. Further, it should be appreciated that although the preferred embodiment of the turbine includes three sections with six blades and six sides, more of less sections, blades, and sides are also contemplated in alternative embodiments.

Figure 6:
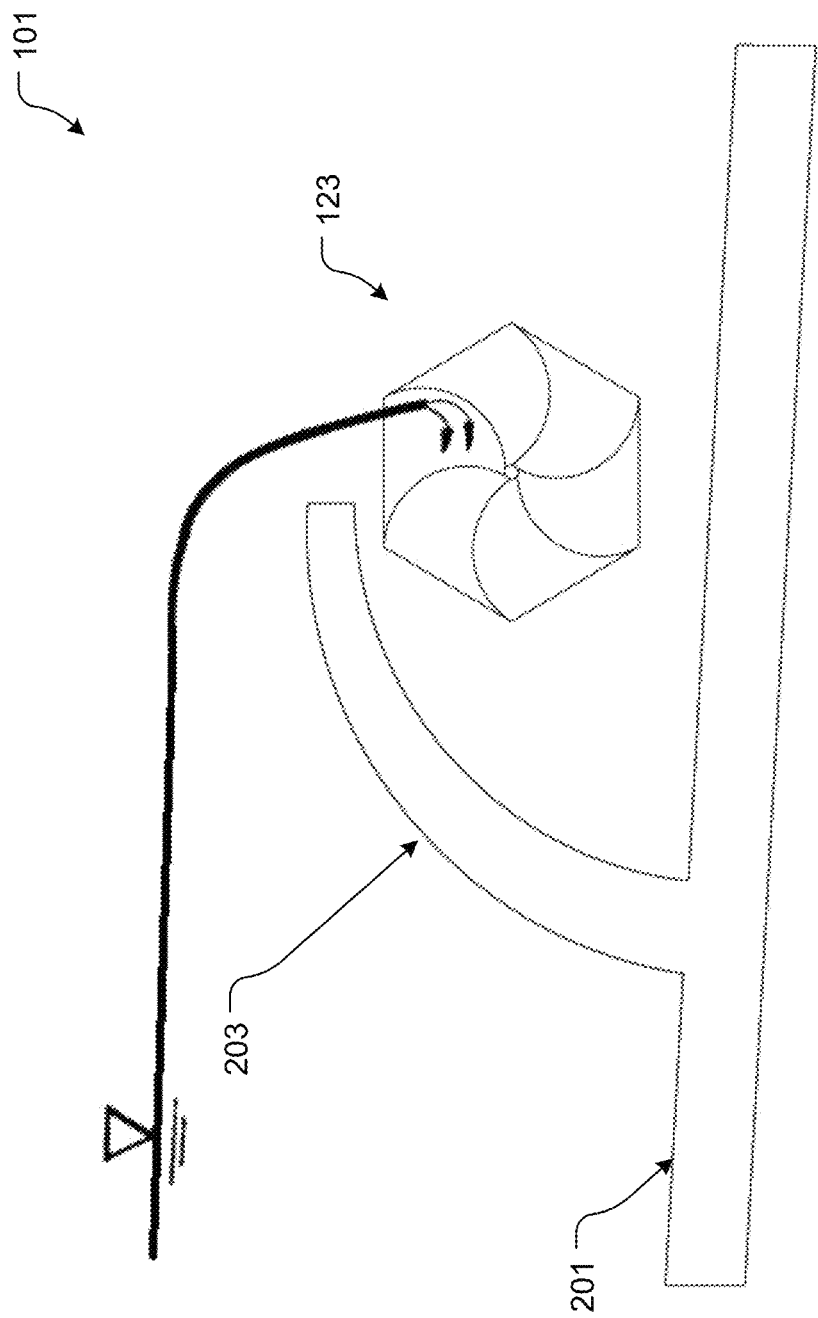
FIG. 6 is a partial side view schematic of the system of FIG. 1.

In FIG. 6, fluid is shown operably associated with one of the turbines 123, wherein the fluid exhibits spatially varied flow. This feature is achieved when a part of water flow is separated from the water path or after each overflow arc that the water falls into the turbines. It will be appreciated that system 101 is configured to provide spatially varied flow with the various contoured surfaces discussed above to achieve maximum efficiency.

Significant improvements with system 101 exist. For example, all the environmental issues in current methods are at their minimum range in the neo-hydroelectric power station. For example, fish can move easily through the bypass channel to the upriver. The system of the present application does not change the downriver at all. The reason is that the sediments and mud of river that remain in the channel will return to the river with a small dredging and opening the gates, which are designed specifically for this purpose. Thus, riverbeds and riverbanks will not be harm.

The capacity of dissolved oxygen in water decreases when the turbines work in current dams. The outlet water is usually warmer than inlet water, and this can put the lives of sensitive species in danger. In the present system, not only does the dissolved oxygen in water not decrease, but it also increases because of repetitive downfall overflows. There is no need for changing the water path to steeper areas, but this is necessary in some dams to increase high pressure so that water passes those areas. This causes damage to the environment, which is resolved in the neo-hydroelectric power station.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A hydroelectric power system, comprising:
    a primary fluid channel, the primary fluid channel having two exterior walls and a bottom integrally secured to the two exterior walls;
    a bypass and secondary channel positioned between the two exterior walls of the primary fluid channel and in fluid communication with the primary channel, wherein the bottom of the primary fluid channel provides a bottom surface for the bypass and the secondary channel, the secondary channel having:
        a downward sloping bottom surface and a side wall configured to form a fluid passage between the side wall and one of the two exterior walls; and
        an upraised concave curved lip integral with the bottom surface and configured to form a cavity within a concave portion of the curved lip;
    wherein the upraised concave curved lip is positioned between the side wall and the one of the two exterior walls;
    the bypass being free of any turbines, thereby allowing for free flowing liquid through the bypass; and
    a first turbine in fluid communication with the secondary channel, the first turbine being configured to fit at least partially within the cavity of the upraised concave curved lip;
    a second turbine in fluid communication with the secondary channel;
    wherein fluid is channeled through the secondary channel and rotates the first turbine and the second turbine, the first turbine and second turbine receiving a same fluid flow to generate equal energy outputs; and
    wherein the bypass and the secondary channel are parallel.

2. The system of claim 1, further comprising:
    a first gate; and
    a second gate;
    wherein the first gate and the second gate are configured to restrict fluid passage through the secondary channel and the bypass channel, respectively.

3. The system of claim 1, wherein the upraised concave curved lip creates a spatial fluid flow of the fluid traveling through the secondary channel.

4. The system of claim 1, wherein the first turbine comprises:
    three sections partitioned from each other via a partition.

5. The system of claim 1, wherein an outer periphery of the first turbine forms six sides.

6. The system of claim 5, wherein the first turbine has six blades.

7. The system of claim 1, the secondary channel comprising:
    three tiers having different elevation heights.

8. A method, comprising:
    providing the system of claim 1;
    creating a spatial fluid flow of the fluid traveling through the secondary channel with the upraised concave curved lip; and
    creating electrical power via the first turbine and the second turbine with the fluid passing over the upraised concave curved lip.

* * * * *